United States Patent
McBain

(10) Patent No.: US 11,673,639 B2
(45) Date of Patent: Jun. 13, 2023

(54) RELUCTANCE DRIVEN AXIAL MODULATING MECHANISM FOR ROTATING SHAFTS REALIZING A CONTROLLABLE PITCH PROPELLER/FAN/TURBINE

(71) Applicant: Jordan James McBain, Commerce Township, MI (US)

(72) Inventor: Jordan James McBain, Commerce Township, MI (US)

(73) Assignee: Jordan McBain, Shelby Township, MI (US)

( * ) Notice: Subject to any disclaimer, the term of this patent is extended or adjusted under 35 U.S.C. 154(b) by 453 days.

(21) Appl. No.: 16/978,743

(22) PCT Filed: Apr. 2, 2020

(86) PCT No.: PCT/US2020/026478
§ 371 (c)(1),
(2) Date: Sep. 7, 2020

(87) PCT Pub. No.: WO2020/172689
PCT Pub. Date: Aug. 27, 2020

(65) Prior Publication Data
US 2021/0016864 A1    Jan. 21, 2021

(51) Int. Cl.
*B64C 11/44* (2006.01)
*F04D 29/36* (2006.01)
(Continued)

(52) U.S. Cl.
CPC .............. *B63H 3/06* (2013.01); *B64C 11/06* (2013.01); *B64C 11/32* (2013.01); *B64C 11/34* (2013.01); *B64C 11/44* (2013.01); *F01D 7/00* (2013.01); *F04D 29/362* (2013.01); *F05D 2240/30* (2013.01)

(58) Field of Classification Search
CPC ......... B64C 11/06; B64C 11/32; B64C 11/34; B64C 11/44; B64C 11/30; B63H 3/06; F01D 7/00; F04D 29/362; F05D 2240/30
See application file for complete search history.

(56) References Cited

U.S. PATENT DOCUMENTS 3,388,694 A    6/1968  Elmer
5,967,749 A   10/1999  Eaves et al.
(Continued)

*Primary Examiner* — Richard A Edgar

(57) ABSTRACT

This patent discloses improvements over a mechanism to modulate the pitch of the blades of a fan, turbine or propeller driven by a rotating shaft bearing a helical thread onto which a nut made of a ferromagnetic material was threaded; this nut was spun by electromagnets disposed about it on the stator system and its resultant axial motion manipulated the blades' pitch. This patent discloses refinement of control of the electromagnets employed to spin the axial modulator by embedding a plurality of ferrous protuberances in this nut—the rotational position of which is determined via metallic edge detection sensors whose logic levels are used to selectively energize electromagnets that apply a force onto the protuberances in order to induce rotation and axial motion on the nut. This additional degree of rotational freedom is controlled by this reluctance-motor like configuration while a second motor is used to spin the blades.

18 Claims, 10 Drawing Sheets

(51) Int. Cl.
  *B63H 3/06* (2006.01)
  *B64C 11/06* (2006.01)
  *B64C 11/32* (2006.01)
  *B64C 11/34* (2006.01)
  *F01D 7/00* (2006.01)

(56) References Cited

U.S. PATENT DOCUMENTS

| | | |
|---|---|---|
| 5,982,117 A | 11/1999 | Taylor et al. |
| 6,253,716 B1 | 7/2001 | Palmer |
| 6,448,736 B1 | 9/2002 | Lajsner et al. |
| 7,008,184 B2 | 3/2006 | Bettencourt |
| 7,568,888 B2 | 8/2009 | Castillo |
| 8,020,655 B2 | 9/2011 | Robinson |
| 10,443,413 B2 | 10/2019 | McBain |
| 2019/0256206 A1 | 8/2019 | McBain |
| 2020/0370441 A1* | 11/2020 | Bhosale ............... F24F 1/38 |

* cited by examiner

23

22

24

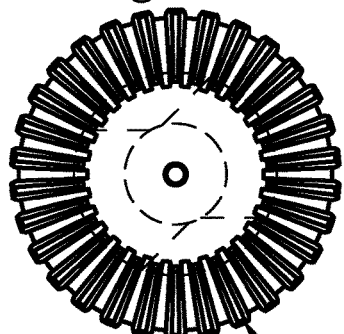
Fig. 6A
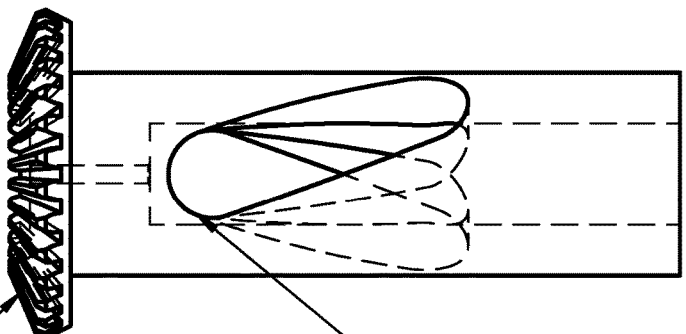
Fig. 6B
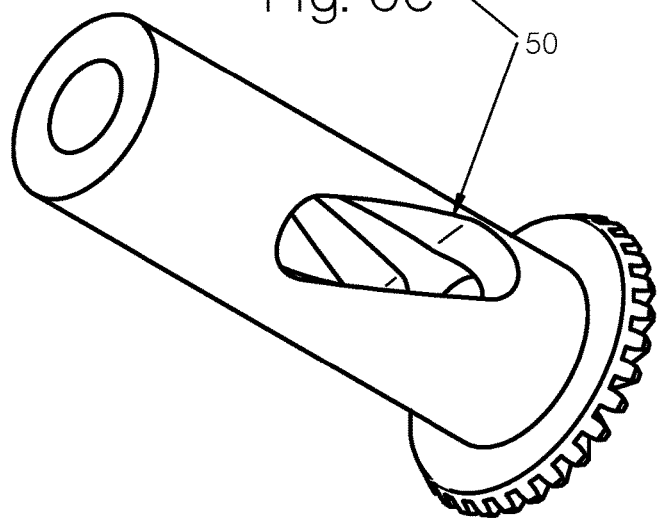
Fig. 6C
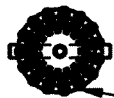
Fig. 7A
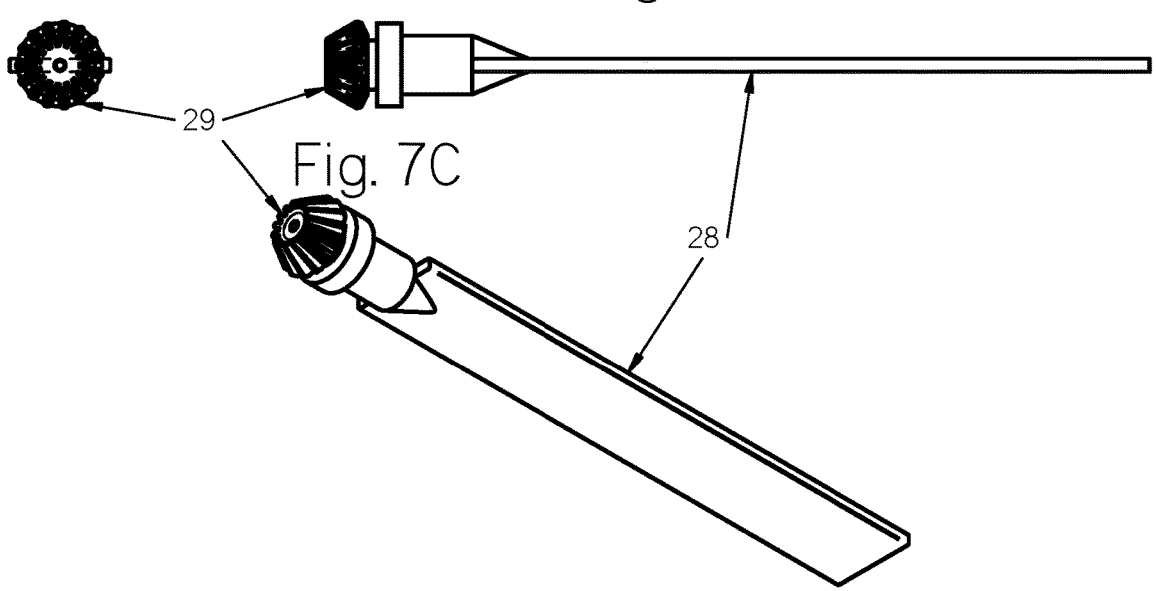
Fig. 7B
Fig. 7C

RELUCTANCE DRIVEN AXIAL MODULATING MECHANISM FOR ROTATING SHAFTS REALIZING A CONTROLLABLE PITCH PROPELLER/FAN/TURBINE

CROSS-REFERENCE TO RELATED APPLICATIONS

This application claims the benefit of U.S. application Ser. No. 15/424,831 filed 4 Feb. 2017 by Jordan McBain and entitled "An Axial Modulating Mechanism for Rotating Shafts Realizing Controllable-Pitch Blade Fans" and published as U.S. Pat. No. 10,443,413/B2. This application claims the benefit to U.S. application Ser. No. 16/397,858 filed 9 Apr. 2019 by Jordan McBain and entitled "Gear-Driven Axial Modulating Mechanism for Rotating Shafts Realizing a Controllable Pitch Propeller/Fan" which is a continuation-in-part to the U.S. application Ser. No. 15/424,831. This application claims the benefit of U.S. Provisional Patent Application No. 62/846,655 filed on 11 May 2019 by Jordan McBain and entitled "Anti-Backlash Nut and Reluctance Driver for Axial Modulating Mechanisms of Rotating Shafts Realizing A Controllable Pitch Propeller/Fan."

BACKGROUND OF THE INVENTION

1. Field of the Invention

An apparatus using a reluctance-motor like configuration to cause axial modulation of an actuator on a rotating shaft to manipulate the pitch of the blades of a controllable-pitch-blade fan, turbine or propeller.

2. Description of the Prior Art

The control of the pitch of a propeller or fan is typically accomplished by a hydraulic piston embedded in the rotating shaft to which the fan or propeller's blades are attached. Hydraulic fluid is then forced from the stator system into the rotating system which actuates the linear position of this hydraulic piston. The hydraulic piston will typically interact with a cam-driven bevel gear which translates the linear motion of the piston into rotational motion; this rotational motion is then translated to the controllable pitch blades via a pinion on the ends of the controllable pitch blades which is in mesh with the bevel gear. This has been the standard in controllable pitch propeller technology in the marine and aerospace sectors for over 100 years.

The core of the technology is the linear actuation. Motorized lead screws are one common alternative means of achieving linear actuation. They are known to provide substantial improvements in efficiency and ease of maintenance over their hydraulic counterparts. The parent patents in this application disclosed a means of employing such a lead screw arrangement.

A rotating system was rotatably mounted in the stator system onto which a rotor thread was affixed. An axial modulator having a helical thread capable of mating threadedly to the rotor thread was then threadedly mated to the rotor thread while the axial modulator was constituted of a material which would experience an acceleration when exposed to a magnetic field. The axial modulator was spun with an axial modulating mechanism comprised of at least one electromagnet(s) affixed to the stator system and disposed about the axial modulator. Each of the electromagnets in the axial modulating mechanism was comprised of windings of insulated electrically conductive material attached to leads through which electric current were selectively routed.

The axial modulator would experience axial motion induced by rotation on the axial modulator relative to the rotating system and the constraints imposed by the axial modulator's (32) threaded mating with the rotating systems' rotor thread when electrical current was applied to the axial-modulating mechanism's electromagnets. A pitch manipulator was rotatably mounted within the axial modulator and was constrained so that it was coupled with the axial modulator's axial motion.

A plurality of controllable-pitch blade(s) was rotatably mounted in the rotating system; each blade in the plurality of controllable-pitch blade(s) was formed to transfer mechanical energy between the rotating system and a fluid in which one or more of the controllable-pitch blade(s) were immersed. The pitch manipulator had a mechanical interaction with the controllable-pitch blade(s) to cause its axial motion to cause each of the controllable-pitch blade(s) to vary their pitch. In U.S. application Ser. No. 16/398,858, this mechanical interaction was based on a rack and pinion interaction between the pitch manipulator and a spur gear on each of the controllable-pitch blade(s).

In U.S. application Ser. No. 16/398,858, the axial modulator was not spun by electromagnets. Instead a spur gear profile was affixed about the axial modulator and a pinion gear was meshed to the axial modulator's spur gear profile; the pinion gear was spun by a second motor with the intent of controlling the pitch of the blades from the axial modulator's axial position.

SUMMARY OF THE INVENTION

The core of the invention lies with the axial modulating mechanism including a stator system into which a rotating system is rotatably mounted. A rotor thread consisting of a helical thread is affixed on the rotor system. An axial modulator having a helical thread capable of mating threadedly to the rotor thread is threadedly mated to the rotor thread. The axial modulator has at least one reluctance protuberance(s) each of which has a constitution that would cause it to accelerate when exposed to a magnetic field.

An axial modulating mechanism comprised of at least one electromagnet(s) affixed to the stator system is disposed about the axial modulator. Each of the axial modulating mechanism's electromagnets are comprised of windings of insulated electrically conductive material having leads through which electric current may be routed. An electronics control unit (ECU), with circuits connected to the leads of at least one of the axial modulating mechanism's electromagnets, is employed to selectively switch electric current to each of the axial modulating mechanism's electromagnets in order to cause the axial modulator to rotate.

A plurality of controllable-pitch blade(s) are rotatably mounted in the rotating system—each blade of which has an axis of rotation at right angles to the axis of rotation of the rotating system about which its pitch may vary. Each blade in the plurality of controllable-pitch blade(s) is formed to transfer mechanical energy between the rotating system and a fluid in which one or more of the controllable-pitch blade(s) are immersed.

The axial modulator has an axial motion induced by rotation on the axial modulator relative to the rotating system and the constraints imposed by the axial modulator's threaded mating with the rotating system's rotor thread when electrical current is applied to the input terminals of the axial-modulating mechanism's electromagnets. A pitch manipulator is rotatably mounted within the axial modulator and constrained so it is coupled with the axial modulator's axial motion.

The pitch manipulator has a mechanical interaction with the controllable-pitch blade(s) to cause its axial motion to cause each of the controllable-pitch blade(s) to vary their pitch.

The axial modulator's reluctance protuberance(s) have two edges at opposite angular extremes—the angular region in between each edge defines the respective reluctance protuberance's angular extent. The position of the axial modulator is then determined by at least one metallic edge detection sensor(s) affixed in the stator system which are disbursed angularly about the axial modulator.

The metallic edge detection sensor(s)' electrical output is connected to electronic components generating a Boolean signal indicating whether or not the angular extent of one of the axial modulator's reluctance protuberance(s) is rotating past the metallic edge detection sensor. The electronics control unit (ECU) is configured to receive the electrical output of the metallic edge detection sensor(s) on circuitry capable of using the Boolean signal to control how the axial modulator is rotated by switching current to the axial modulating mechanism's electromagnet(s).

Advantages of the Invention

A fan, propeller or turbine operated under varying speeds is inefficient unless the pitch of the application's blades is also varied.

Marine and aeronautic applications currently employing hydraulically actuated controllable-pitch technology could benefit by a means that eliminates the inefficiencies of the hydraulic piston as well as its maintenance burdens. Hydraulic actuation requires the actuator be embedded in the rotating shaft rather than being configured on the outside of the shaft. This requires a means of forcing hydraulic fluid from the stator system into the rotor system via an oil distribution box which is grievously inefficient (in addition to the normal inefficiencies experienced with a hydraulic piston).

The free market has yet to realize an apparatus which could manipulate the pitch of a turbine's blades; this is likely due to the fact that any mechanical interaction between the rotor and stator system would introduce unacceptable friction losses in this high-speed, low-torque application.

In heating-ventilation-and-air-conditioning applications over the past decades, the main differentiator has been the use of controllable-speed fans and yet fans operated under varying speeds are inefficient unless their pitch is also varied. Each mini-split air conditioning system has at least two fans (one inside and one for every indoor application).

Automotive cooling fans are operated under varying speed and yet no solution has arisen that balances efficiency with the cost sensitivity of such applications.

The advent of small drones and personal aircraft, possibly operated with electric technology, demands a simple solution to varying the pitch of the blades that has yet to reach maturity.

The invention in its broadest aspect provides for an apparatus causing axial modulation of an actuator on a rotating shaft to manipulate the pitch of the blades of a controllable-pitch-blade fan, turbine or propeller.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 3 A and B are orthogonal views of the rotor lock (23) while

FIGS. 4 A and B are orthogonal views of the rotating system (22) and its rotor thread (24) while

FIGS. 5 A and B are orthogonal views of the pitch-manipulator sleeve (47) while

FIGS. 6 A and B are orthogonal views of the pitch-manipulator bevel gear (49) while FIG. 6C is a perspective view of the same.

FIGS. 7 A and B are orthogonal views of the controllable-pitch blade(s) (28) while FIG. 7C is a perspective view of the same.

FIG. 8A is an orthogonal view of the stator system (20) while

DESCRIPTION OF THE ENABLING EMBODIMENT

Figure 1:
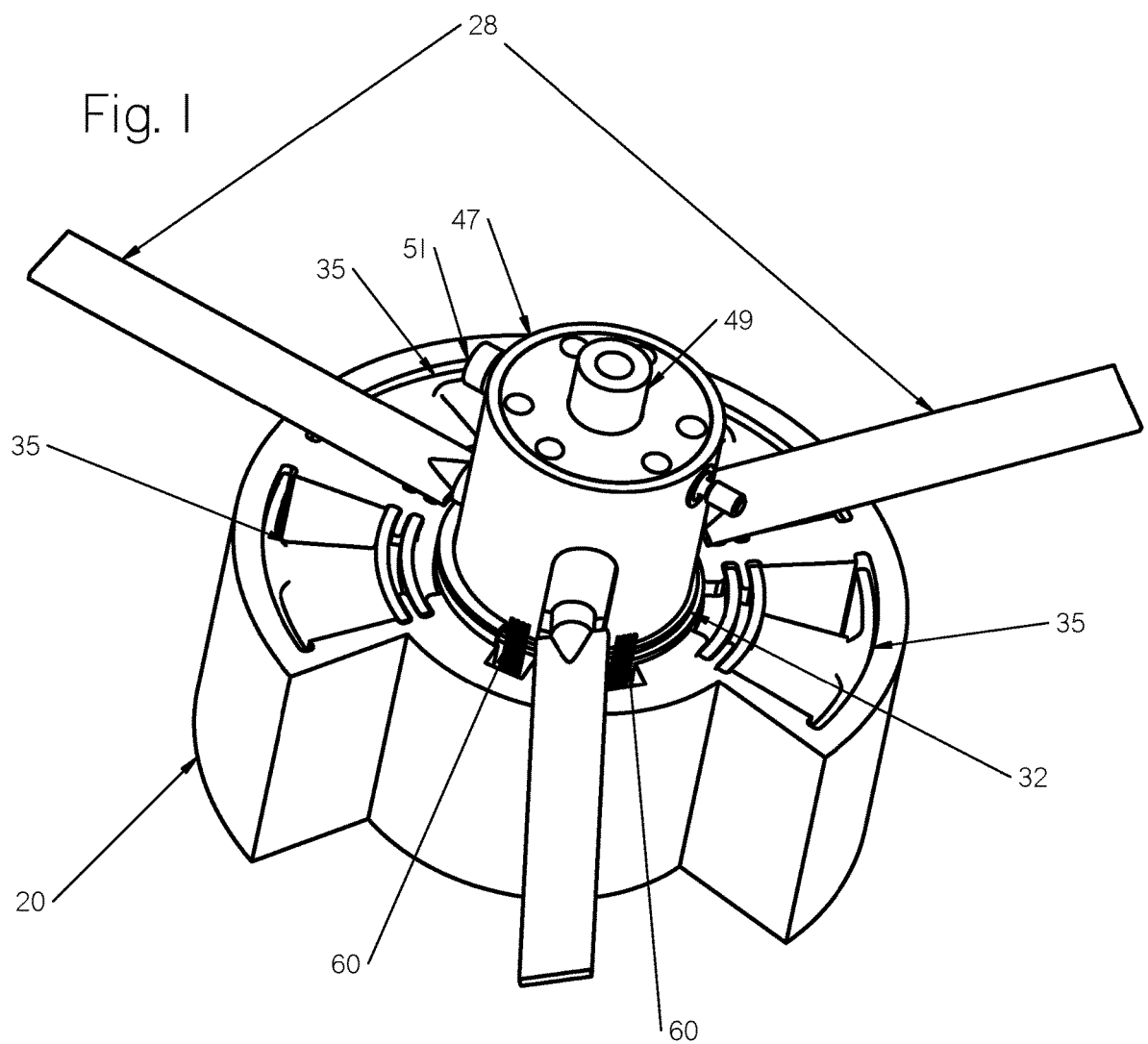
FIG. 1 is a perspective view of the apparatus for a controllable-pitch fan.
Figure 2:
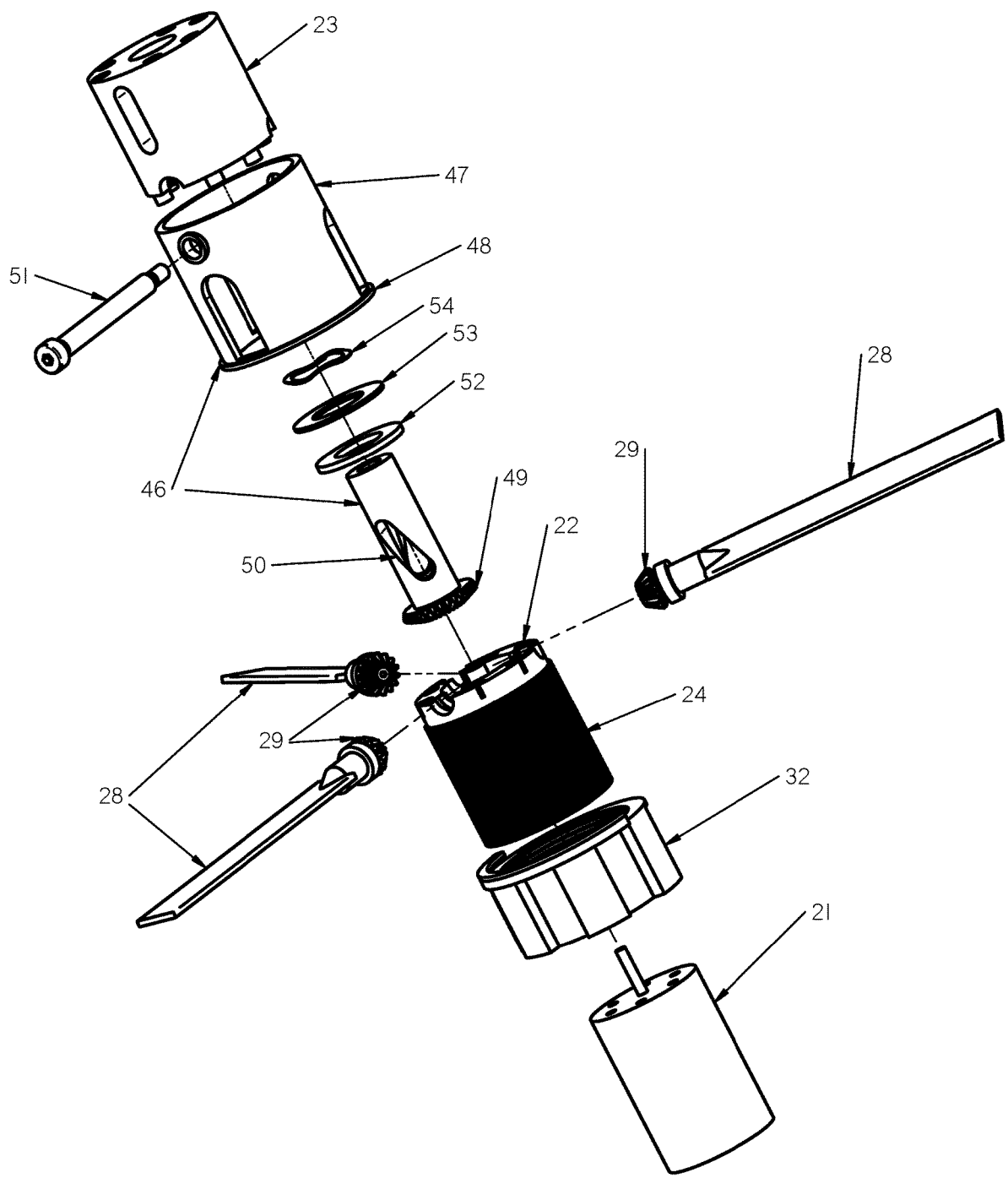
FIG. 2 is an exploded view of the controllable-pitch fan's rotating components.
Figure 3A:
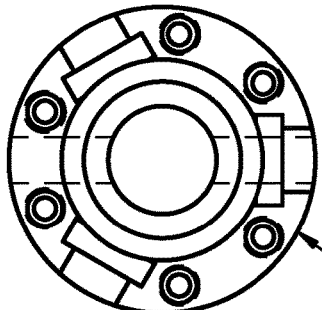
Figure 3B:
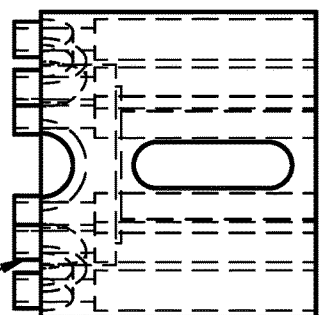
Figure 3C:
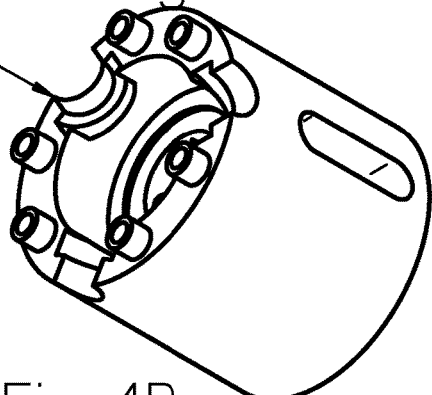
FIG. 3C is a perspective view of the same.
Figure 4A:
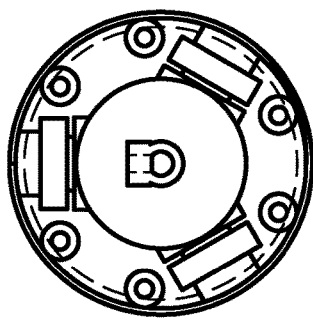
Figure 4B:
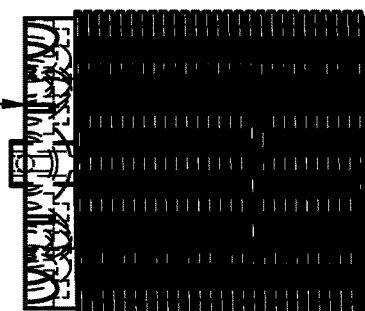
Figure 4C:
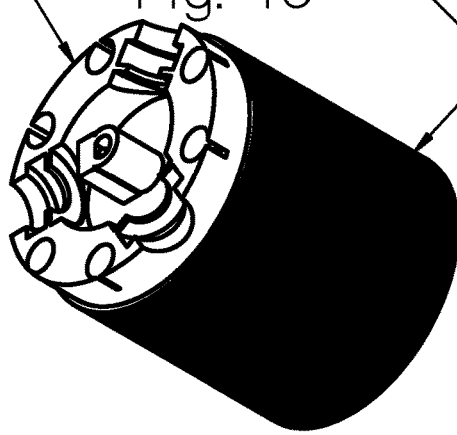
FIG. 4C is a perspective view of the same.
Figures 5A, 5B, 5C:
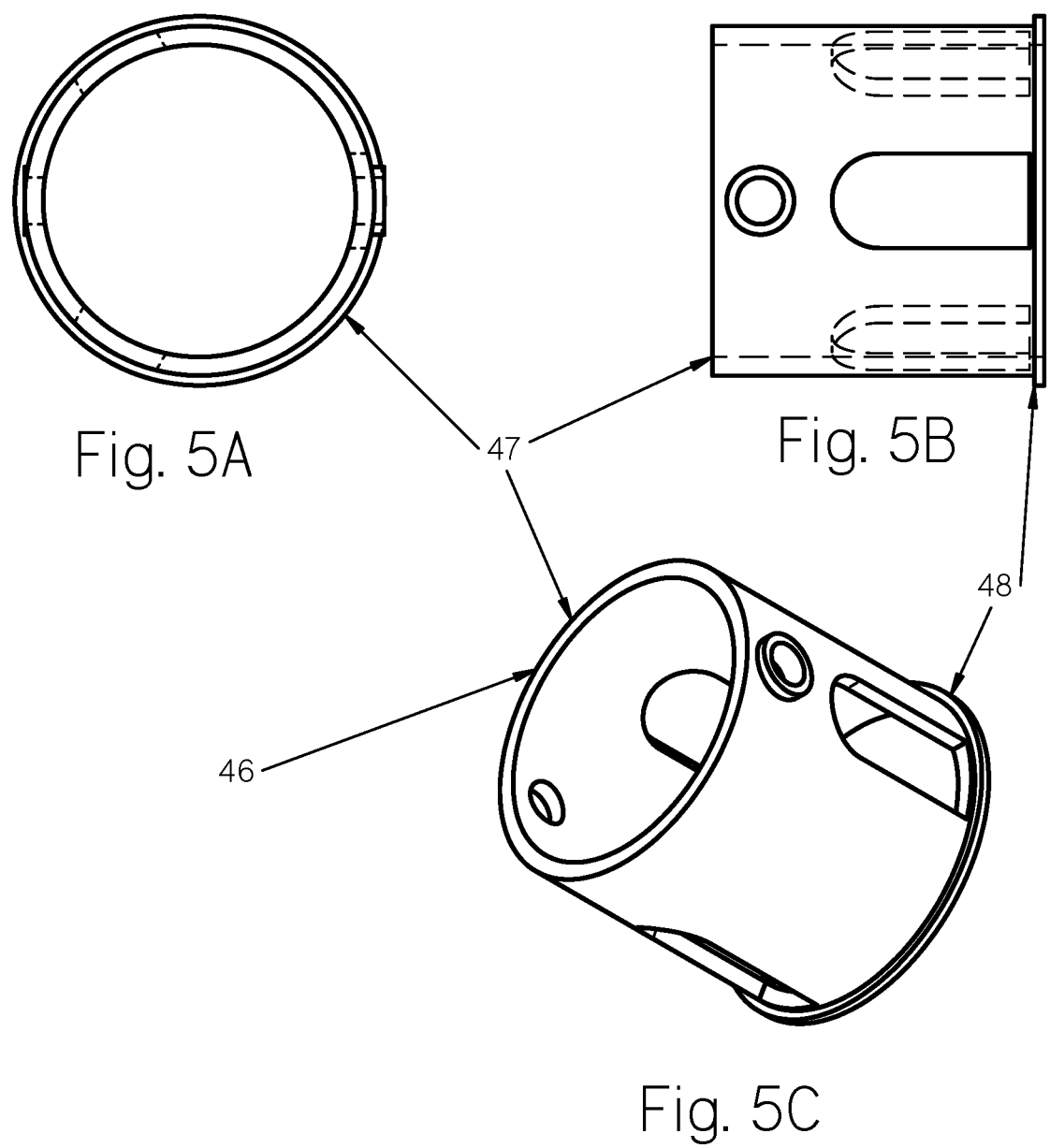
FIG. 5C is a perspective view of the same.
Figure 8A:
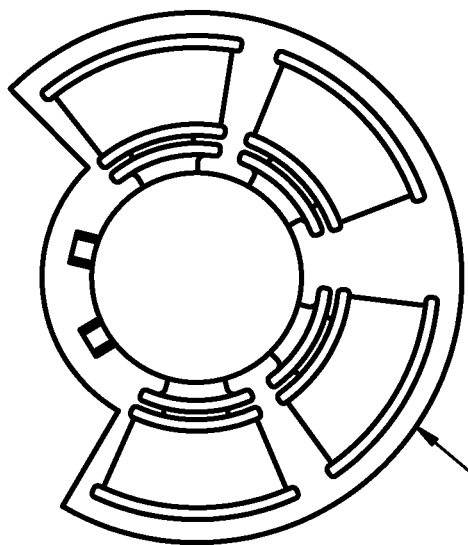
Figure 8B:
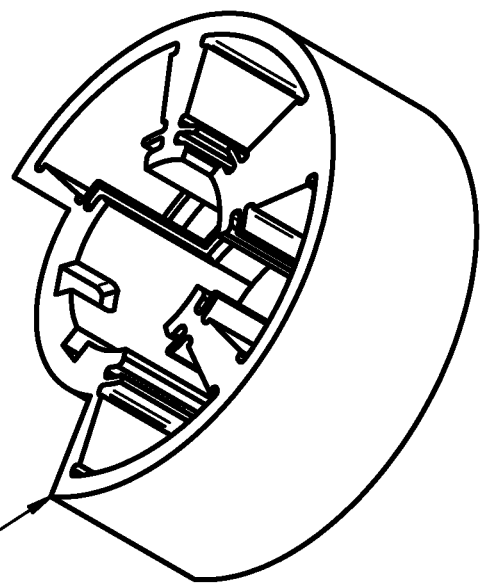
FIG. 8B is a perspective view of the same.
Figure 9:
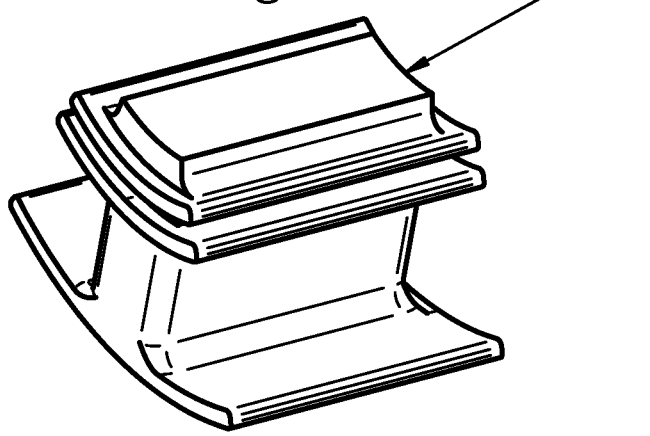
FIG. 9 is a perspective view of the electromagnet's base employed with the axial modulating mechanism (35).
Figure 10:
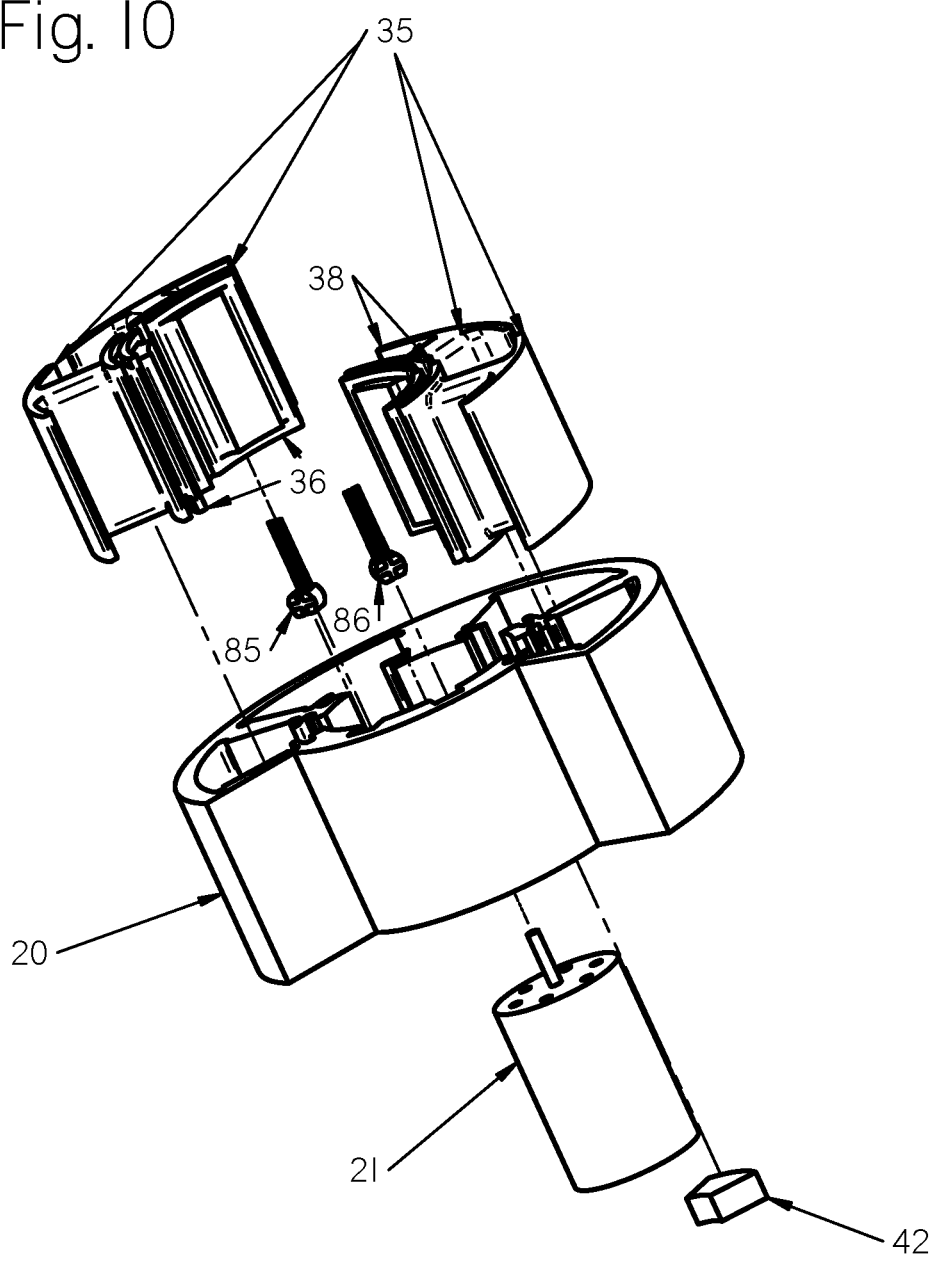
FIG. 10 is an exploded view of the stator system showing the prime mover (21), first electromagnetic stage (36), second electromagnetic stage (38), metallic edge detection sensors, and axial distance sensor.
Figure 11:
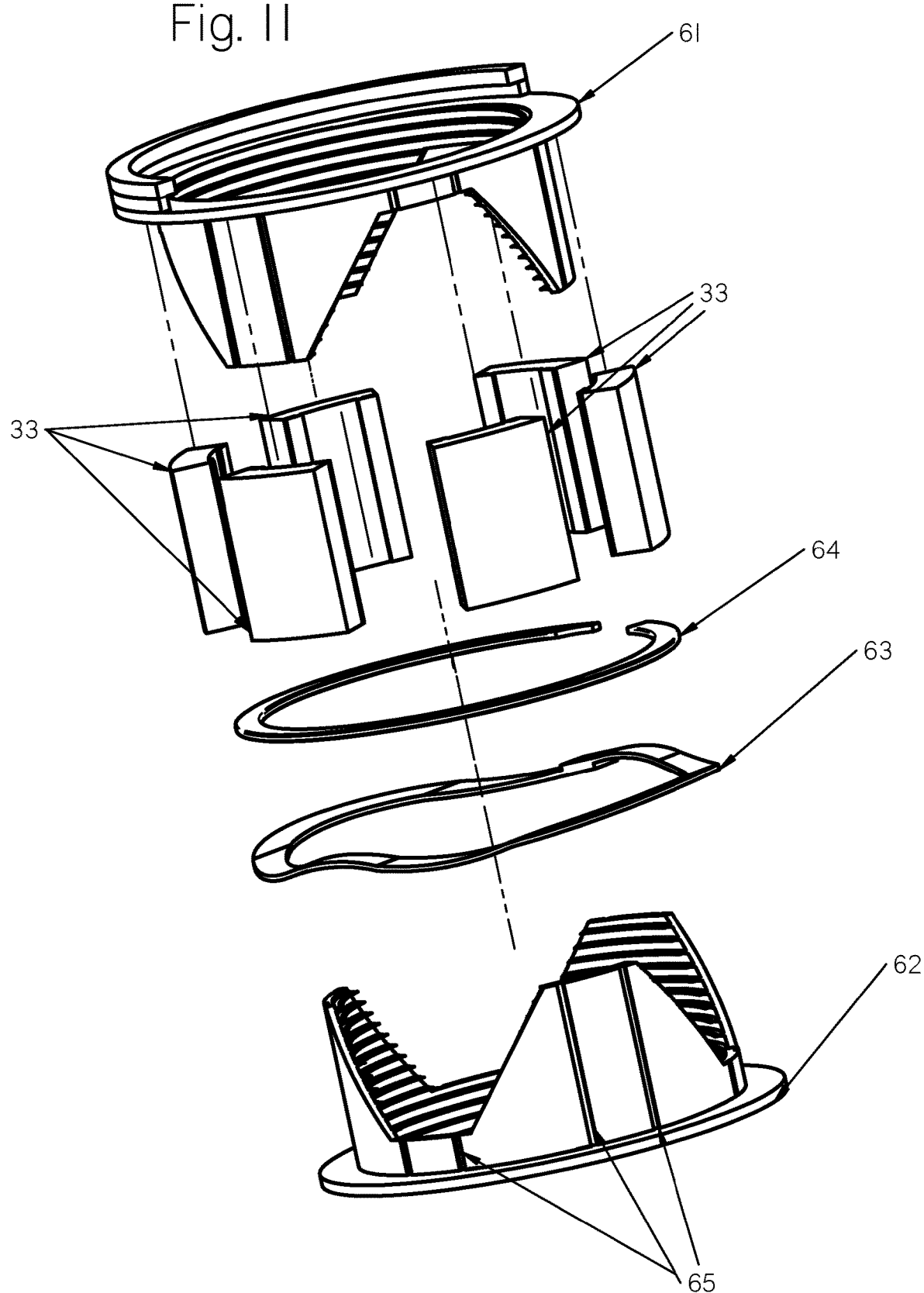
FIG. 11 is an exploded view of the anti-backlash nut mechanism.
Figure 12:
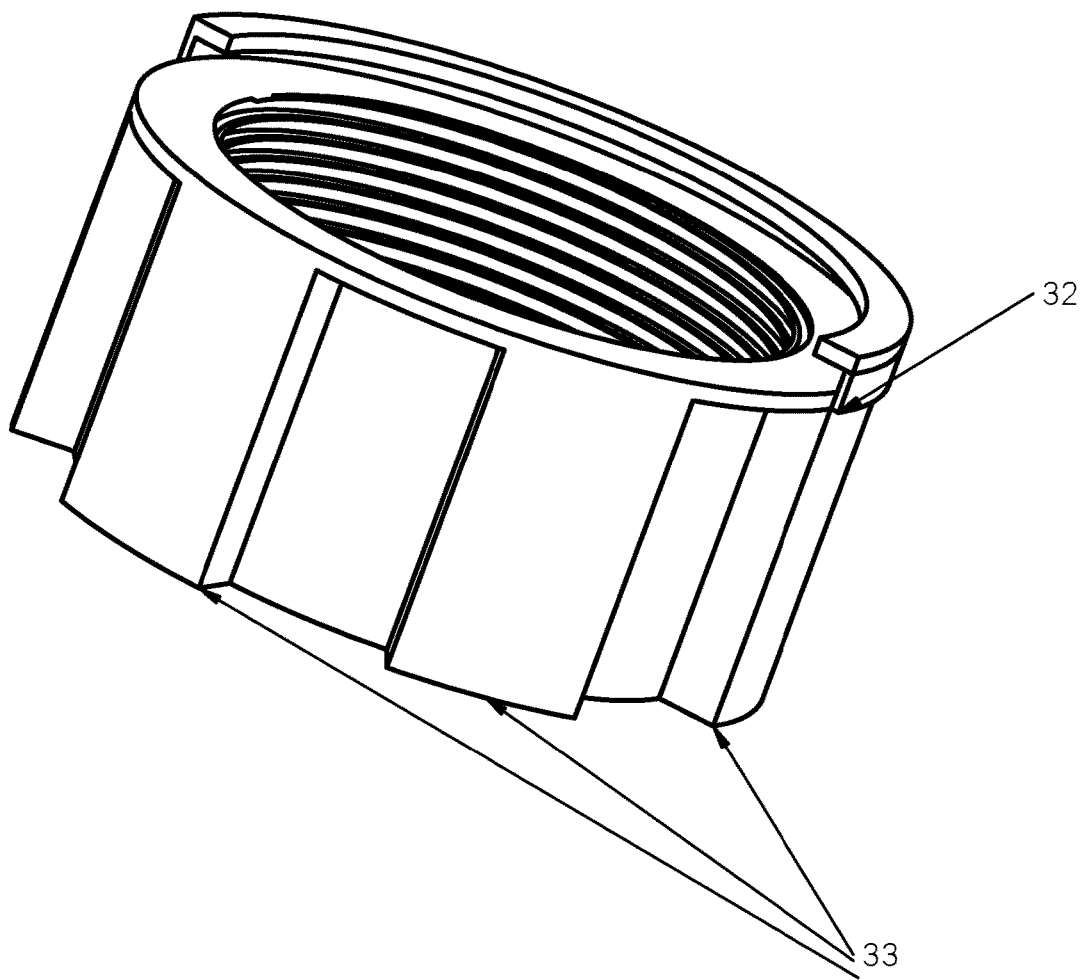
FIG. 12 is a perspective view of the axial modulator (32) and its reluctance protuberance(s) (33).
Figure 13A:
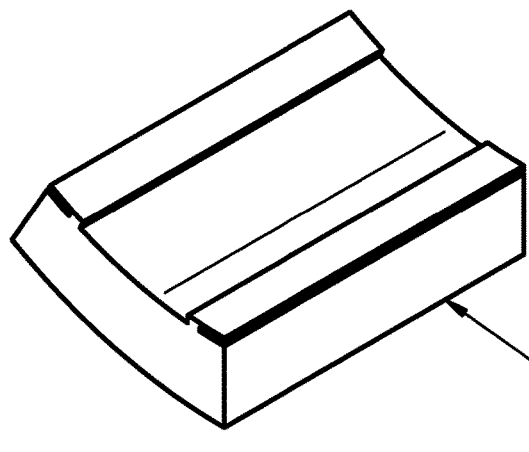
FIG. 13A is a perspective view of the reluctance protuberance(s) (33) employed with the anti-backlash nut mechanism while FIG. 13 B is an orthogonal view of the same.
Figure 13B:
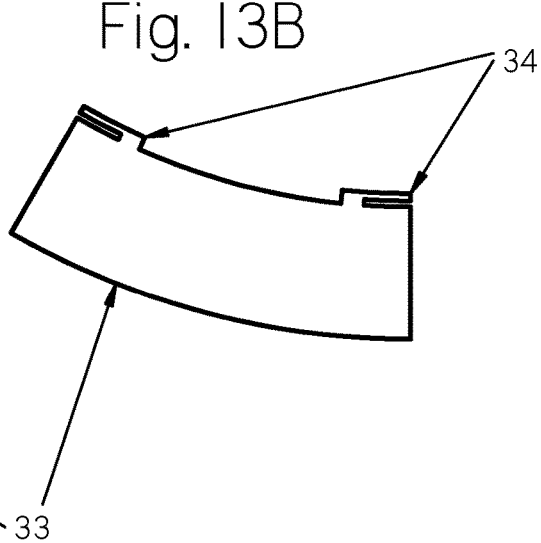
Figure 14:
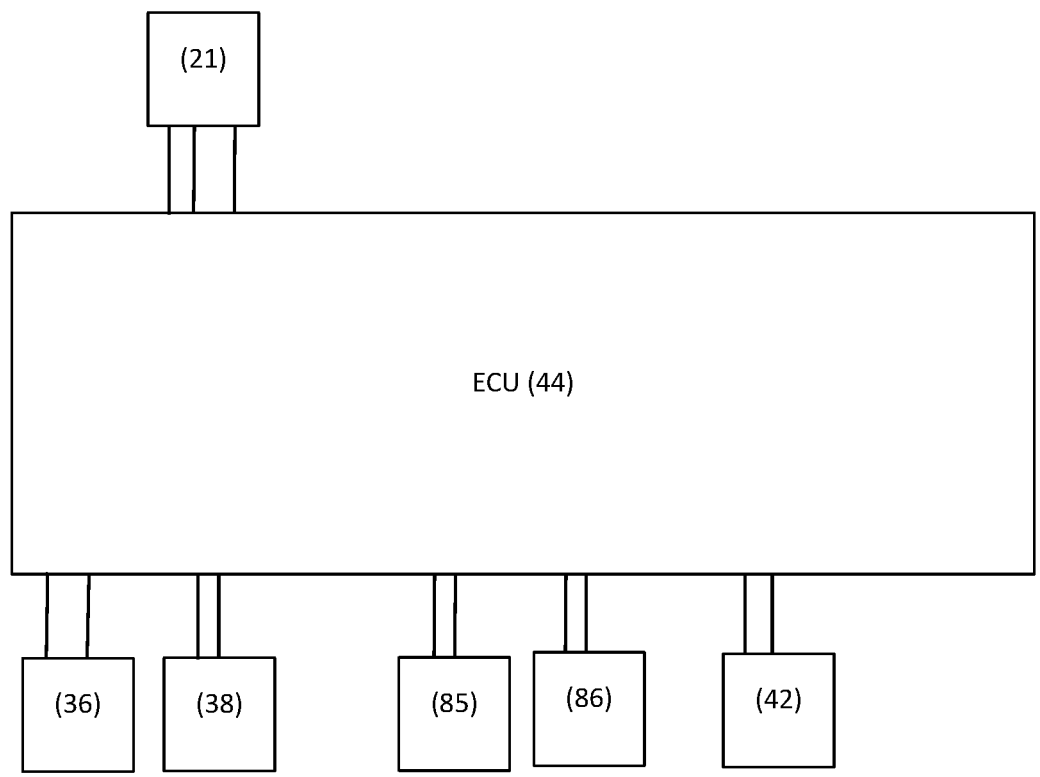
FIG. 14 is an electrical schematic of the electronics control unit (ECU) (44).

Referring to the Figures, wherein like numerals indicate corresponding parts throughout the several views, an apparatus for a reluctance-driven axial modulating mechanism employed to realize a controllable-pitch fan, propeller or turbine is described.

A stator system (20) hosts a rotating system (22) rotatably mounted in the stator system (20). A rotor thread (24) consisting of a helical thread is affixed on the rotating system (22). An axial modulator (32) having a helical thread capable of mating threadedly to the rotor thread (24) is threadedly mated to the rotor thread (24). The axial modulator (32) has least one reluctance protuberance(s) (33) having a constitution that would cause the reluctance protuberance(s) (33) to accelerate when exposed to a magnetic field.

An axial modulating mechanism (35) comprised of at least one electromagnet(s) is affixed to the stator system (20) and disposed about the axial modulator (32); each of the axial modulating mechanism's (35) electromagnets are comprised of windings of insulated electrically conductive material having leads through which electric current may be routed. An electronics control unit (ECU) (44) has circuits connected to the leads of at least one of the axial modulating mechanism's (35) electromagnets. The electronics control unit (ECU) (44) circuits are configured to selectively switch electric current to each of the axial modulating mechanism's

(35) electromagnets connected to the electronics control unit (ECU) (44) in order to cause the axial modulator (32) to rotate.

Each reluctance protuberance (33) extends radially outward from the axial modulator (32). Each reluctance protuberance (33) has two edges at opposite angular extremes—the angular region in between each edge defining the respective reluctance protuberance's (33) angular extent.

At least one metallic edge detection sensor(s) (60) are affixed in the stator system (20) and disbursed angularly about the axial modulator (32). The metallic edge detection sensor(s) (60) have an electrical output connected to electronic components generating a Boolean signal on the metallic edge detection sensor's (60) electrical output indicating whether or not the angular extent of one of the axial modulator's (32) reluctance protuberance(s) (33) is rotating past the metallic edge detection sensor (60). The electronics control unit (ECU) (44) is configured to receive the electrical output from the metallic edge detection sensor(s) (60); the ECU has circuitry capable of using the Boolean signal from each of the metallic edge detection sensor(s) (60) connected to the ECU (44) to control how the axial modulator (32) is rotated by switching current to the axial modulating mechanism's (35) electromagnet(s) connected to the ECU (44).

The axial modulator (32) might have a plastic constitution while each of the reluctance protuberance(s) (33) would have a ferrous constitution; each of the reluctance protuberance(s) (33) is then rigidly affixed within the axial modulator (32).

A metallic edge detection sensor (60) is typically achieved with hall effect sensors such as the ATS617LSGTN-T provided by Allegro Microsystems which has a built in magnet used to achieve the ferrous edge detection. The metallic edge detection sensor(s) (60) might alternatively be achieved by coupling a hall-effect sensor with an electromagnet since the magnet employed with typical hall effect sensors might induce unwanted rotation in the axial modulator (32) at a time when the axial modulator (32) should have a fixed position. Any sensor capable of measuring distance could suffice as a metallic edge detection sensor (60).

The rotating system (22) is defined to have an axis of rotation around which it revolves. The axial modulating mechanism (35) would then employ four electromagnets dispersed angularly about the rotating system's (22) axis of rotation. Each electromagnet in the axial modulating mechanism (35) has a magnetic field with a magnetic pole generated by applying electric current to the respective electromagnet's leads. The axial modulating mechanism's (35) electromagnets are oriented such that the respective electromagnet's magnetic pole is oriented radially inward towards the rotating system's (22) axis of rotation—the polarity of this magnetic pole is defined radially inward towards the rotating system's (22) axis of rotation.

A first electromagnetic stage (36) is deployed comprising two angularly adjacent electromagnets from the axial modulating mechanism (35). One lead from each of the first electromagnetic stage's (36) electromagnets are connected together electrically forming an electrical bridge for the first electromagnetic stage (36). The remaining leads from each of the first electromagnetic stage's (36) electromagnets not connected together in the first electromagnetic stage's (36) electrical bridge form the input terminals of the first electromagnetic stage (36).

A second electromagnetic stage (38) is deployed comprising two angularly adjacent electromagnets from the axial modulating mechanism (35) not employed in the first electromagnetic stage (36). One lead from each of the second electromagnetic stage's (38) electromagnets are connected together electrically forming an electrical bridge for the second electromagnetic stage (38). The remaining leads from each of the second electromagnetic stage's (38) electromagnets not connected together in the second electromagnetic stage's (38) electrical bridge form the input terminals of the second electromagnetic stage (38).

The windings of each electromagnet in the first electromagnetic stage (36) are wound so that the polarity of the magnetic pole of one electromagnet in the first electromagnetic stage (36) is opposite from the polarity of the other electromagnet in the first electromagnetic stage (36) when electric current is applied to the first electromagnetic stage's (36) input terminals.

The windings of each electromagnet in the second electromagnetic stage (38) are wound so that the polarity of the magnetic pole of one electromagnet in the second electromagnetic stage (38) is opposite from the polarity of the other electromagnet in the second electromagnetic stage (38) when electric current is applied to the second electromagnetic stage's (38) input terminals.

Instead of making the axial modulator (32) out of plastic, the axial modulator (32) might instead be made out of a ferrous material and its reluctance protuberance(s) (33) would then be made to consist of ferrous protuberances sticking out of the core of the axial modulator (32). All of the axial modulator's (32) reluctance protuberance(s) (33) are dispersed equiangularly about the axial modulator (32) and all of the axial modulator's (32) reluctance protuberance(s) (33) have equal angular extents.

The first electromagnetic stage's (36) electromagnets are dispersed angularly so as to align with two adjacent reluctance protuberance(s) (33) from the axial modulator (32) when the axial modulator (32) is stationary. The second electromagnetic stage's (38) electromagnets are similarly dispersed in an angular fashion so as to align with two adjacent reluctance protuberance(s) (33) when the axial modulator (32) is stationary.

A first metallic edge detection sensor (85) is connected to the electronics control unit (ECU) (44). A second metallic edge detection sensor (86) is connected to the electronics control unit (ECU) (44). The electronics control unit (ECU) (44) circuits are configured to employ the Boolean signal from the first metallic edge detection sensor (85) and the Boolean signal from the second metallic edge detection sensor (86) to control the application of current to the first electromagnetic stage (36). Similarly the electronics control unit (ECU) (44) circuits are configured to employ the Boolean signal from the first metallic edge detection sensor (85) and the Boolean signal from the second metallic edge detection sensor (86) to control the application of current to the second electromagnetic stage (38).

The rotating system (22) is defined to have direction of rotation having a clockwise or counter-clockwise orientation and the axial modulator (32) is defined to have a direction of rotation defined in a consistent direction to that of the rotating system's (22) direction of rotation.

The first metallic edge detection sensor (85) is dispersed angularly about the axial modulator (32) such that the Boolean signal from the first metallic edge detection sensor (85) would transition values as one of the axial modulator's (32) reluctance protuberance(s) (33) is rotating toward the first electromagnetic stage (36) at a time when applying electric current to the first electromagnetic stage (36) would cause the axial modulator (32) to accelerate towards the first electromagnetic stage (36).

The second metallic edge detection sensor (86) is dispersed angularly about the axial modulator (32) such that the Boolean signal from the second metallic edge detection sensor (86) would transition values before the application of current to the first electromagnetic stage (36) would cause the retardation of the rotation induced on the axial modulator (32) that resulted when the Boolean signal from the first metallic edge detection sensor (85) triggered the electronics control unit (ECU) (44) circuits to apply current to the first electromagnetic stage (36).

The second electromagnetic stage (38) is disposed angularly in relation to the first electromagnetic stage (36) so that enabling current to the second electromagnetic stage (38) causes the axial modulator (32) to experience further acceleration in the angular direction the axial modulator (32) was induced to rotate after energizing and then de-energizing the first electromagnetic stage (36).

The rotor thread (24) is defined to have a linear extent along the rotating system (22) defined by where the rotor thread (24) ends and begins.

An axial distance sensor (42) has output terminals and circuitry capable of measuring the displacement of the axial modulator (32) as the axial modulator (32) traverses the linear extent of the rotor thread (24). The measure of the displacement of the axial modulator (32) is provided as an electrical signal on the axial distance sensor's (42) output terminals. The axial distance sensor (42) is disposed in relation to the rotor thread (24) to enable the axial distance sensor's (42) circuits to measure the displacement of the axial modulator (32) as the axial modulator (32) traverses the linear extent of the rotor thread (24).

The electronics control unit (ECU) (44) circuits receive the output terminals of the axial distance sensor (42).

The logic employed by the ECU (44) to decide when to switch current to the axial-modulating mechanism (35) is very similar to the logic employed to spin a typical reluctance motor. Normally a reluctance motor's position can be determined by a positioning strategy and sensor employed with any other motor. The configuration in this teaching introduces a second degree of angular freedom via the axial modulator's (32) threaded interaction with the rotating system (22). This extra degree of rotational freedom mandates the use of the metallic edge detection sensor (60) to discern where the axial modulator (32) is. The significant challenge associated with commutating a reluctance motor stems from difficulties with starting the reluctance motor's rotation. In the case of the teachings contained herein, the reluctance protuberance(s) (33) will already be spinning because of the friction between the axial modulator (32) and the rotor thread (24) generating when the rotating system (22) is forced to spin.

Each of the reluctance protuberance(s) (33) has a height at right angles to the reluctance protuberance's (33) angular extent sufficient to ensure the respective reluctance protuberance (33) is exposed to the magnetic field of each of the axial modulating mechanism's (35) electromagnet(s) as the axial modulator (32) traverses the linear extent of the rotor thread (24). Alternatively, each of the axial modulating mechanism's (35) electromagnet(s) has a height measured in the orientation of the rotating system's (22) axis of rotation sufficient to ensure each of the electromagnet(s) in the axial modulating mechanism (35) exerts an electromagnetic force onto each of the axial modulator's (32) reluctance protuberance(s) (33) as the axial modulator (32) traverses the linear extent of the rotor thread (24) when current is applied to the respective electromagnet's input terminals.

A plurality of controllable-pitch blade(s) (28) are rotatably mounted in the rotating system (22). Each blade in the plurality of controllable-pitch blade(s) (28) is defined to have an axis of rotation at right angles to the axis of rotation of the rotating system (22) about which its pitch may vary. Each blade in the plurality of controllable-pitch blade(s) (28) is formed to transfer mechanical energy between the rotating system (22) and a fluid in which one or more of the controllable-pitch blade(s) (28) are immersed.

The axial modulator (32) having axial motion induced by rotation on the axial modulator (32) relative to the rotating system (22) and the constraints imposed by the axial modulator's (32) threaded mating with the rotating system' (22) rotor thread (24) when electrical current is applied to the input terminals of the axial-modulating mechanism's (35) electromagnet(s).

A pitch manipulator (46) is rotatably mounted within the axial modulator (32) and constrained so that the pitch manipulator (46) is coupled with the axial modulator's (32) axial motion. The pitch manipulator (46) has a mechanical interaction with the controllable-pitch blade(s) (28) to cause its axial motion to cause each of the controllable-pitch blade(s) (28) to vary their pitch.

Each blade in the plurality of controllable-pitch blade(s) (28) has two ends—one of which is rotatably mounted within the rotating system (22). Each blade in the plurality of controllable-pitch blade(s) (28) has a controllable-pitch-blade bevel gear (29) disposed at the end of the respective blade rotatably mounted within the rotating system (22).

The pitch manipulator (46) has a pitch-manipulator bevel gear (49) in mesh with each of the controllable-pitch-blade bevel gear(s) (29). The pitch manipulator's (46) mechanical interaction with the controllable-pitch blade(s) (28) is driven by a bevel gear interaction between the pitch-manipulator bevel gear (49) and each of the controllable-pitch-blade bevel gear(s) (29).

The pitch manipulator (46) has a pitch-manipulator sleeve (47) rotatably mounted within the axial modulator (32). The pitch-manipulator sleeve (47) is constrained within the axial modulator (32) such that the pitch-manipulator sleeve (47) has linear motion coupled with the axial motion of the axial modulator (32). A pitch-manipulator cam driver (51) is affixed within the pitch-manipulator sleeve (47) and is inserted into the pitch-manipulator bevel gear's (49) bevel gear cam slot (50) which is configured to cause the pitch-manipulator bevel gear (49) to rotate as the pitch-manipulator sleeve (47) and the pitch-manipulator cam driver (51) are forced linearly by the axial modulator's (32) axial motion.

A rotor lock (23) is employed to constrain the plurality of controllable-pitch blade(s) (28) to the rotating system (22) so that each blade in the plurality of controllable-pitch blade(s) (28) is free to rotate (i.e. its pitch may be varied). The pitch-manipulator bevel gear (49) is rotatably mounted within the rotor lock (23).

The pitch-manipulator sleeve (47) has a rotor void through which the rotor lock (23) may pass as the axial modulator (32) traverses the linear extent of the rotor thread (24). The rotor lock (23) is inserted into the pitch-manipulator sleeve's (47) rotor void.

The rotor lock (23) has a void into which the pitch-manipulator cam driver (51) is inserted. The void in the rotor lock (23) is configured to permit the pitch-manipulator cam driver (51) to interact with the bevel gear cam slot (50) as the axial modulator (32) traverses the linear extent of the rotor thread (24). The pitch-manipulator sleeve (47) has a plurality of blade voids through which each blade in the plurality of controllable-pitch blade(s) (28) may pass as the pitch-manipulator sleeve (47) undergoes linear motion; each blade in the plurality of controllable-pitch blade(s) (28) is inserted into a respective blade void in the pitch-manipulator sleeve's (47) plurality of blade voids.

A bevel-gear thrust bearing (52), a bevel-gear washer (53), and a bevel-gear wave spring (54) are employed as an array together to force the pitch-manipulator bevel gear (49) against the controllable-pitch-blade bevel gear(s) (29) by inserting this array in between the pitch-manipulator bevel gear (49) the rotor lock (23).

As an alternative to the pitch manipulator's (46) cam driven operation each blade in the plurality of controllable-pitch blade(s) (28) might instead have a spur gear with a spur gear profile configured at right angles to the respective blade's axis of rotation. In this alternative, each of the pitch manipulator's (46) blade voids has a linear gear oriented parallel to the rotating system's (22) axis of rotation. Each blade in the plurality of controllable-pitch blade(s) (28) is disposed within a respective pitch manipulator (46) blade void and each spur gear of each blade in the plurality of controllable-pitch blade(s) (28) is in mesh with the linear gear of the respective blade void into which the respective blade is disposed within the pitch manipulator (46). The pitch manipulator's (46) mechanical interaction with each of the controllable-pitch blade(s) (28) is driven by a rack-and-pinion interaction between each spur gear of each blade in the plurality of controllable-pitch blade(s) (28) and the pitch manipulator's (46) respective linear gear with which the respective spur gear is in mesh. The transfer of one mechanism's linear actuation to the variation of a blade's pitch has been central in controllable-pitch technology since its inception with hydraulically actuated blades. The variant employing a rack-and-pinion interaction was disclosed in U.S. application Ser. No. 16/398,858.

This rack-and-pinion variant might further be varied by configuring the spur gear from each blade in the plurality of controllable-pitch blade(s) (28) to have a helical spur gear profile. Each linear gear affixed within the pitch manipulator's (46) blade voids is then configured to have a helical form. A helical rack-and-pinion interaction will minimize the amount of backlash and vibration. Such a variant would be more suitable to automotive applications while the cam-driven interaction would be more suitable to aerospace and marine applications.

A prime mover (21) is mechanically coupled to the rotating system (22) and is configured to impart torque onto the rotating system (22) in order to induce the rotating system (22) to rotate. The prime mover (21) is configured as an electric motor powered by input terminals that are supplied by circuits from the electronics control unit (ECU) (44) which are connected to the prime mover's (21) input terminals to provide power to the prime mover (21) to cause it to induce a torque onto the rotating system (22).

The prime mover (21) has a speed sensor with output terminals onto which the speed sensor imparts an electrical signal commensurate with the speed sensor's measure of the rotating system's (22) angular speed. The electronics control unit (ECU) (44) circuits receive the speed sensor's output terminals. The electronics control unit (ECU) (44) circuits connected to the prime mover's (21) input terminals are configured to measure the prime mover's (21) back-emf.

The electronics control unit (ECU) (44) has circuits capable of calculating the displacement of the axial modulator (32), as the axial modulator (32) traverses the linear extent of the rotor thread (24), given the measure of the prime mover's (21) back-emf and the measure of the rotating system's (22) angular speed.

Some applications may not tolerate the backlash and resultant vibration in the axial modulator's (32) thread. To address this concern, the axial modulator (32) is divided into an upper anti-backlash nut (61) and a lower anti-backlash nut (62) each of which has a helical thread capable of mating threadedly to the rotor thread (24); the upper anti-backlash nut (61) and lower anti-backlash nut (62) are configured to abut together and to transfer rotational force from one to the other. The upper anti-backlash nut (61) and lower anti-backlash nut (62) are abutted together and threadedly mated to the rotor thread (24). A spring is deployed in between the upper anti-backlash nut (61) and the lower anti-backlash nut (62)—the combination of which comprises an anti-backlash nut for this application.

Each reluctance protuberance (33) in the plurality of reluctance protuberance(s) (33) has protuberance retaining tracks (34). Similarly the upper anti-backlash nut (61) and the lower anti-backlash nut (62) have axial-modulator retention paths (65). The axial-modulator retention paths (65) and the protuberance retaining tracks (34) are configured so as to cause the each reluctance protuberance (33) to be constrained within the axial modulator (32) when the respective reluctance protuberance's (33) protuberance retaining tracks (34) are inserted into one of the upper anti-backlash nut's (61) axial-modulator retention paths (65) and one of the lower anti-backlash nut (62) axial-modulator retention paths (65). Each reluctance protuberance (33) in the plurality of reluctance protuberance(s) is inserted into the upper anti-backlash nut (61) and the lower anti-backlash nut (62) by inserting the respective reluctance protuberance's (33) protuberance retaining tracks (34) into one of the upper anti-backlash nut's (61) axial-modulator retention paths (65) and one of the lower anti-backlash nut's (62) axial-modulator retention paths (65). The spring deployed in between the upper anti-backlash nut (61) and the lower anti-backlash nut (62) consists of an anti-backlash wave spring (63) which is inserted in between the plurality of reluctance protuberance(s) (33) and the axial modulator (32) while an anti-backlash retaining ring (64) is inserted in between the plurality of reluctance protuberance(s) (33) and the anti-backlash wave spring (63).

The axial modulator (32) and the rotating system (22) have a threaded interaction. This threaded interaction can be characterized by an acme thread the friction of which creates a self-locking mechanism amplified by the thread's pitch (mechanical advantage); an acme thread is well suited to applications where the manipulation of the axial modulator (32) does not occur frequently as it will eliminate the need to employ constant electricity (power) to maintain the blade's pitch. Ball-screw and roller-screw threaded interaction are often marketed as being more efficient since they eliminate much of this threaded friction; this proposition depends on applications which are constantly varying axial position. Nevertheless, there may be applications where the axial-modulating mechanism discussed in these teachings could take advantage of ball-screw and roller-screw interactions.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LISTING

(20) stator system
(21) prime mover
(22) rotating system
(23) rotor lock
(24) rotor thread
(28) controllable-pitch blade
(29) controllable-pitch-blade bevel gear
(32) axial modulator
(33) reluctance protuberance
(34) protuberance retaining tracks
(35) axial-modulating mechanism
(36) first electromagnetic stage
(38) second electromagnetic stage
(42) axial distance sensor
(44) electronics control unit (ECU)
(46) pitch manipulator
(47) pitch-manipulator sleeve
(49) pitch-manipulator bevel gear
(50) bevel gear cam slot
(51) pitch-manipulator cam driver
(52) bevel-gear thrust bearing
(53) bevel-gear washer
(54) bevel-gear wave spring
(60) metallic edge detection sensor
(61) upper anti-backlash nut
(62) lower anti-backlash nut
(63) anti-backlash wave spring
(64) anti-backlash retaining ring
(65) axial-modulator retention paths
(85) first metallic edge detection sensor
(86) second metallic edge detection sensor

What is claimed is:

1. An apparatus for a reluctance-driven axial modulating mechanism including;
   a stator system (20),
   a rotating system (22) rotatably mounted in said stator system (20),
   a rotor thread (24) consisting of a helical thread affixed on said rotating system (22),
   an axial modulator (32) having a helical thread capable of mating threadedly to said rotor thread (24),
   said axial modulator (32) being threadedly mated to said rotor thread (24),
   an axial modulating mechanism (35) comprised of at least one electromagnet(s) affixed to said stator system (20) and disposed about said axial modulator (32),
   each of said electromagnets in said axial modulating mechanism (35) comprised of windings of insulated electrically conductive material having leads through which electric current may be routed,
   and characterized by,
   said axial modulator (32) having at least one reluctance protuberance(s) (33),
   each of said axial modulator's (32) reluctance protuberance(s) (33) having a constitution that would cause said reluctance protuberance(s) (33) to accelerate when exposed to a magnetic field,
   an electronics control unit (ECU) (44) having circuits connected to the leads of at least one of said axial modulating mechanism's (35) electromagnets,
   said electronics control unit (ECU) (44) circuits are configured to selectively switch electric current to each of said axial modulating mechanism's (35) electromagnets connected to said electronics control unit (ECU) (44) in order to cause said axial modulator (32) to rotate.

2. An apparatus as set forth in claim 1 further characterized by;
   each reluctance protuberance (33) extending radially outward from said axial modulator (32),
   each respective reluctance protuberance (33) in said axial modulator (32) having two edges at opposite angular extremes — the angular region in between each edge defining the respective reluctance protuberance's (33) angular extent,
   at least one metallic edge detection sensor(s) (60) affixed in said stator system (20) and disbursed angularly about said axial modulator (32),
   each of said metallic edge detection sensor(s) (60) having an electrical output,
   each of said metallic edge detection sensor(s) (60) having electronic components generating a Boolean signal on said metallic edge detection sensor's (60) electrical output indicating whether or not the angular extent of one of said axial modulator's (32) reluctance protuberance(s) (33) is rotating past said metallic edge detection sensor (60),
   said electronics control unit (ECU) (44) being configured to receive said electrical output of said metallic edge detection sensor(s) (60) and having circuitry capable of using the Boolean signal from each of said metallic edge detection sensor(s) (60) connected to said ECU (44) to control how said axial modulator (32) is rotated by switching current to said axial modulating mechanism's (35) electromagnet(s) connected to said ECU (44).

3. An apparatus as set forth in claim 1 further characterized by;
   said axial modulator (32) having a plastic constitution,
   each of said reluctance protuberance(s) (33) having a ferrous constitution,
   each of said reluctance protuberance(s) (33) being rigidly affixed within said axial modulator (32).

4. An apparatus as set forth in claim 2 further characterized by said metallic edge detection sensor(s) (60) comprised of a hall-effect sensor and an electromagnet.

5. An apparatus as set forth in claim 2 further characterized by;
   said rotating system (22) having an axis of rotation around which said rotating system (22) revolves,
   said axial modulating mechanism (35) having four electromagnets dispersed angularly about said rotating system's (22) axis of rotation,
   each electromagnet in said axial modulating mechanism (35) having a magnetic field with a magnetic pole generated by applying electric current to said electromagnet's leads,
   each of said axial modulating mechanism's (35) electromagnets oriented such that the respective electromagnet's magnetic pole is oriented radially inward towards said rotating system's (22) axis of rotation, said magnetic pole of each of said axial modulating mechanism's (35) electromagnets having a polarity whose direction is defined radially inward towards said rotating system's (22) axis of rotation, a first electromagnetic stage (36) comprising two angularly adjacent electromagnets from said axial modulating mechanism (35), one lead from each of said first electromagnetic stage's (36) electromagnets being connected together electrically forming an electrical bridge for said first electromagnetic stage (36), the remaining leads from each of said first electromagnetic stage's (36) electromagnets not connected together in said first electromagnetic stage's (36) electrical bridge forming the input terminals of said first electromagnetic stage (36), a second electromagnetic stage (38) comprising two angularly adjacent electromagnets from said axial modulating mechanism (35) not employed in said first electromagnetic stage (36), one lead from each of said second electromagnetic stage's (38) electromagnets being connected together electrically forming an electrical bridge for said second electromagnetic stage (38), the remaining leads from each of said second electromagnetic stage's (38) electromagnets not connected together in said second electromagnetic stage's (38) electrical bridge forming the input terminals of said second electromagnetic stage (38), the windings of each electromagnet in said first electromagnetic stage (36) being wound so that the polarity of the magnetic pole of one electromagnet in said first electromagnetic stage (36) is opposite from the polarity of the other electromagnet in said first electromagnetic stage (36) when electric current is applied to said first electromagnetic stage's (36) input terminals, the windings of each electromagnet in said second electromagnetic stage (38) being wound so that the polarity of the magnetic pole of one electromagnet in said second electromagnetic stage (38) is opposite from the polarity of the other electromagnet in said second electromagnetic stage (38) when electric current is applied to said second electromagnetic stage's (38) input terminals, said axial modulator (32) and all of said axial modulator's (32) reluctance protuberance(s) (33) having a ferrous constitution, all of said axial modulator's (32) reluctance protuberance(s) (33) being dispersed equiangularly about said axial modulator (32), all of said axial modulator's (32) reluctance protuberance(s) (33) having equal angular extents, said first electromagnetic stage's (36) electromagnets being dispersed angularly so as to align with two adjacent reluctance protuberance(s) (33) from said axial modulator (32) when said axial modulator (32) is stationary, said second electromagnetic stage's (38) electromagnets being dispersed angularly so as to align with two adjacent reluctance protuberance(s) (33) from said axial modulator (32) when said axial modulator (32) is stationary, a first metallic edge detection sensor (85) being connected to said electronics control unit (ECU) (44), a second metallic edge detection sensor (86) being connected to said electronics control unit (ECU) (44), said electronics control unit (ECU) (44) circuits being configured to employ said Boolean signal from said first metallic edge detection sensor (85) and said Boolean signal from said second metallic edge detection sensor (86) to control the application of current to said first electromagnetic stage (36), said electronics control unit (ECU) (44) circuits being configured to employ said Boolean signal from said first metallic edge detection sensor (85) and said Boolean signal from said second metallic edge detection sensor (86) to control the application of current to said second electromagnetic stage (38), said rotating system's (22) direction of rotation having a clockwise or counter-clockwise orientation, said axial modulator (32) having a direction of rotation defined in a consistent direction to that of said rotating system's (22) direction of rotation, said first metallic edge detection sensor (85) being dispersed angularly about said axial modulator (32) such that said Boolean signal from said first metallic edge detection sensor (85) would transition values as one of said axial modulator's (32) reluctance protuberance(s) (33) is rotating toward said first electromagnetic stage (36) at a time when applying electric current to said first electromagnetic stage (36) would cause said axial modulator (32) to accelerate towards said first electromagnetic stage (36), said second metallic edge detection sensor (86) being dispersed angularly about said axial modulator (32) such that said Boolean signal from said second metallic edge detection sensor (86) would transition values before the application of current to said first electromagnetic stage (36) would cause the retardation of the rotation induced on said axial modulator (32) that resulted when said Boolean signal from said first metallic edge detection sensor (85) triggered said electronics control unit (ECU) (44) circuits to apply current to said first electromagnetic stage (36), said second electromagnetic stage (38) being disposed angularly in relation to said first electromagnetic stage (36) so that enabling current to said second electromagnetic stage (38) causes said axial modulator (32) to experience further acceleration in the angular direction said axial modulator (32) was induced to rotate after energizing and then de-energizing said first electromagnetic stage (36).

6. An apparatus as set forth in claim 5 further characterized by;

said rotor thread (24) having a linear extent along said rotating system (22) defined by where said rotor thread (24) ends and begins, an axial distance sensor (42) having output terminals, said axial distance sensor (42) having circuitry capable of measuring the displacement of said axial modulator (32) as said axial modulator (32) traverses the linear extent of said rotor thread (24), said measure of said displacement of said axial modulator (32) provided as an electrical signal on said axial distance sensor's (42) output terminals, said axial distance sensor (42) disposed in relation to said rotor thread (24) to enable said axial distance sensor's (42) circuits to measure the displacement of said axial modulator (32) as said axial modulator (32) traverses the linear extent of said rotor thread (24), said electronics control unit (ECU) (44) circuits receiving said output terminals of said axial distance sensor (42).

7. An apparatus as set forth in claim 5 further characterized by;

said rotor thread (24) having a linear extent along said rotating system (22) defined by where said rotor thread (24) ends and begins, each of said reluctance protuberance(s) (33) having a height at right angles to said reluctance protuberance's (33) angular extent sufficient to ensure said respective reluctance protuberance (33) is exposed to the magnetic field of each of said axial modulating mechanism's (35) electromagnet(s) as said axial modulator (32) traverses the linear extent of said rotor thread (24).

8. An apparatus as set forth in claim 5 further characterized by;

said rotor thread (24) having a linear extent along said rotating system (22) defined by where said rotor thread (24) ends and begins, each of said axial modulating mechanism's (35) electromagnet(s) having a height measured in the orientation of said rotating system's (22) axis of rotation, said height of each of said electromagnet(s) in said axial modulating mechanism (35) being sufficient to ensure each of said electromagnet(s) in said axial modulating mechanism (35) exerts an electromagnetic force onto each of said axial modulator's (32) reluctance protuberance(s) (33) as said axial modulator (32) traverses the linear extent of said rotor thread (24) when current is applied to the respective electromagnet's input terminals.

9. An apparatus for controllable-pitch blades employing the reluctance-driven axial modulating mechanism set forth in claim 8 further including;

a plurality of controllable-pitch blade(s) (28) being rotatably mounted in said rotating system (22), each blade in said plurality of controllable-pitch blade(s) (28) having an axis of rotation at right angles to said axis of rotation of said rotating system (22) about which its pitch may vary, each blade in said plurality of controllable-pitch blade(s) (28) being formed to transfer mechanical energy between said rotating system (22) and a fluid in which one or more of said controllable-pitch blade(s) (28) are immersed, and characterized by, said axial modulator (32) having axial motion induced by rotation on said axial modulator (32) relative to said rotating system (22) and the constraints imposed by said axial modulator's (32) threaded mating with said rotating system' (22) rotor thread (24) when electrical current is applied to said input terminals of said axial-modulating mechanism's (35) electromagnets, a pitch manipulator (46) being rotatably mounted within said axial modulator (32) and constrained so that said pitch manipulator (46) is coupled with said axial modulator's (32) axial motion, said pitch manipulator (46) having a mechanical interaction with said controllable-pitch blade(s) (28) to cause its axial motion to cause each of said controllable-pitch blade(s) (28) to vary their pitch.

10. An apparatus for controllable-pitch blades as set forth in claim 9 further characterized by;

each blade having two ends — one of which is rotatably mounted within said rotating system (22), each blade in said plurality of controllable-pitch blade(s) (28) having a controllable-pitch-blade bevel gear (29) disposed at the end of the respective blade rotatably mounted within said rotating system (22), said pitch manipulator (46) having a pitch-manipulator bevel gear (49), said pitch-manipulator bevel gear (49) in mesh with each of said controllable-pitch-blade bevel gear(s) (29), said pitch manipulator's (46) mechanical interaction with said controllable-pitch blade(s) (28) driven by a bevel gear interaction between said pitch-manipulator bevel gear (49) and each of said controllable-pitch-blade bevel gear(s) (29), said pitch manipulator (46) having a pitch-manipulator sleeve (47), said pitch-manipulator sleeve (47) being rotatably mounted within said axial modulator (32), said pitch-manipulator sleeve (47) constrained within said axial modulator (32) such that said pitch-manipulator sleeve (47) has linear motion coupled with said axial motion of said axial modulator (32), a pitch-manipulator cam driver (51) being affixed within said pitch-manipulator sleeve (47), said pitch-manipulator bevel gear (49) having a bevel gear cam slot (50), said pitch-manipulator cam driver (51) being inserted into said bevel gear cam slot (50), said bevel gear cam slot (50) being configured to cause said pitch-manipulator bevel gear (49) to rotate as said pitch-manipulator sleeve (47) and said pitch-manipulator cam driver (51) are forced linearly by said axial modulator's (32) axial motion, a rotor lock (23) constrains said plurality of controllable-pitch blade(s) (28) to said rotating system (22) so that each blade in said plurality of controllable-pitch blade(s) (28) is free rotate, said pitch-manipulator bevel gear (49) rotatably mounted within said rotor lock (23), said pitch-manipulator sleeve (47) having a rotor void through which said rotor lock (23) may pass as said axial modulator (32) traverses the linear extent of said rotor thread (24), said rotor lock (23) inserted into said rotor void of said pitch-manipulator sleeve (47), said rotor lock (23) having a void into which said pitch-manipulator cam driver (51) is inserted, said void in said rotor lock (23) configured to permit said pitch-manipulator cam driver (51) to interact with said bevel gear cam slot (50) as said axial modulator (32) traverses the linear extent of said rotor thread (24), said pitch-manipulator sleeve (47) having a plurality of blade voids through which said plurality of controllable-pitch blade(s) (28) may pass as said pitch-manipulator sleeve (47) undergoes linear motion, each blade in said plurality of controllable-pitch blade(s) (28) inserted into a respective blade void in said pitch-manipulator sleeve's (47) plurality of blade voids, a bevel-gear thrust bearing (52), a bevel-gear washer (53), a bevel-gear wave spring (54), said pitch-manipulator bevel gear (49) forced against said controllable-pitch-blade bevel gear(s) (29) by an array formed by said bevel-gear wave spring (54), said bevel-gear thrust bearing (52), and said bevel-gear washer (53) where said array is inserted in between said pitch-manipulator bevel gear (49) and said rotor lock (23).

11. An apparatus for controllable-pitch blades as set forth in claim 9 further characterized by;
- each blade in said plurality of controllable-pitch blade(s) (28) having a spur gear having a spur gear profile configured at right angles to the respective blade's axis of rotation,
- said pitch manipulator (46) having a plurality of blade voids through which said plurality of controllable-pitch blade(s) (28) may pass as said pitch manipulator (46) undergoes linear motion,
- each of said pitch manipulator's (46) blade voids having a linear gear oriented parallel to said rotating system's (22) axis of rotation,
- each blade in said plurality of controllable-pitch blade(s) (28) disposed within a respective pitch manipulator (46) blade void,
- each spur gear of each blade in said plurality of controllable-pitch blade(s) (28) in mesh with the linear gear of the respective blade void into which the respective blade is disposed within said pitch manipulator (46),
- said pitch manipulator's (46) mechanical interaction with each of said controllable-pitch blade(s) (28) being driven by a rack and pinion interaction between each spur gear of each blade in said plurality of controllable-pitch blade(s) (28) and the respective linear gear of said pitch manipulator (46) with which the respective spur gear is in mesh.

12. An apparatus for controllable-pitch blades as set forth in claim 11 further characterized by;
- said spur gear from each blade in said plurality of controllable-pitch blade(s) (28) having a helical spur gear profile,
- each linear gear affixed within said pitch manipulator's (46) blade voids having a helical form.

13. An apparatus for controllable-pitch blades as set forth in claim 9 further characterized by;
- a prime mover (21) mechanically coupled with said rotating system (22),
- said prime mover (21) configured to impart torque onto said rotating system (22) in order to induce said rotating system (22) to rotate,
- said prime mover (21) configured as an electric motor powered by input terminals,
- said electronics control unit (ECU) (44) having circuits connected to said prime mover's (21) input terminals onto which said ECU provides electric current in order to cause said prime mover (21) to induce a torque onto said rotating system (22),
- said rotating system (22) having an angular speed,
- said prime mover (21) having a speed sensor capable of measuring said angular speed of said rotating system (22),
- said prime mover's (21) speed sensor having output terminals onto which said speed sensor imparts an electrical signal commensurate with said speed sensor's measure of said rotating system's (22) angular speed,
- said electronics control unit (ECU) (44) having circuits connected to said output terminals of said prime mover's (21) speed sensor,
- said prime mover (21) generating a back-emf,
- said circuitry of said electronics control unit (ECU) (44) connected to said input terminals of said prime mover (21) configured to measure said prime mover's (21) back-emf,
- said rotor thread (24) having a linear extent along said rotating system (22) defined by where said rotor thread (24) ends and begins,
- said electronics control unit (ECU) (44) having circuits capable of calculating the displacement of said axial modulator (32), as said axial modulator (32) traverses the linear extent of said rotor thread (24), given said prime mover's (21) back-emf and said measure of said rotating system's (22) angular speed from said prime mover's (21) speed sensor.

14. An apparatus as set forth in claim 1 further characterized by;
- said axial modulator (32) comprised of an upper anti-backlash nut (61) and a lower anti-backlash nut (62),
- said upper anti-backlash nut (61) having a helical thread capable of mating threadedly to said rotor thread (24),
- said lower anti-backlash nut (62) having a helical thread capable of mating threadedly to said rotor thread (24),
- said upper anti-backlash nut (61) and said lower anti-backlash nut (62) being configured to abut together and to transfer rotational force from one to the other,
- said upper anti-backlash nut (61) and said lower anti-backlash nut (62) being abutted together and threadedly mated to said rotor thread (24),
- a spring deployed in between said upper anti-backlash nut (61) and said lower anti-backlash nut (62) the combination of which comprises an anti-backlash nut.

15. An apparatus as set forth in claim 14 further characterized by;
- said upper anti-backlash nut (61) and said lower anti-backlash nut (62) having axial-modulator retention paths (65),
- each reluctance protuberance (33) in said plurality of reluctance protuberance(s) (33) having protuberance retaining tracks (34),
- said axial-modulator retention paths (65) and said protuberance retaining tracks (34) configured so as to cause said each reluctance protuberance (33) to be constrained within said axial modulator (32) when the respective reluctance protuberance's (33) protuberance retaining tracks (34) are inserted into one of said upper anti-backlash nut's (61) axial-modulator retention paths (65) and one of said lower anti-backlash nut (62) axial-modulator retention paths (65),
- each reluctance protuberance (33) in said plurality of reluctance protuberance(s) inserted into said upper anti-backlash nut (61) and said lower anti-backlash nut (62) by inserting the respective reluctance protuberance's (33) protuberance retaining tracks (34) into one of said upper anti-backlash nut's (61) axial-modulator retention paths (65) and one of said lower anti-backlash nut's (62) axial-modulator retention paths (65),
- said spring deployed in between said upper anti-backlash nut (61) and said lower anti-backlash nut (62) consisting of an anti-backlash wave spring (63),
- said anti-backlash wave spring (63) inserted in between said plurality of reluctance protuberance(s) (33) and said axial modulator (32),
- an anti-backlash retaining ring (64) inserted in between said plurality of reluctance protuberance(s) (33) and said anti-backlash wave spring (63).

16. An apparatus for controllable pitch blades including;
- a stator system (20),
- a rotating system (22) rotatably mounted in said stator system (20), an axial modulator (32),
- said axial modulator (32) and said rotating system (22) having a threaded interaction, an axial modulating mechanism (35) comprised of at least one electromagnet(s) affixed to said stator system (20) and disposed about said axial modulator (32), each of said electromagnets in said axial modulating mechanism (35) comprised of windings of insulated electrically conductive material having leads through which electric current may be routed, a plurality of controllable-pitch blade(s) (28) rotatably mounted in said rotating system (22), one or more blade(s) in said plurality of controllable-pitch blade(s) (28) formed to transfer mechanical energy between said rotating system (22) and a fluid in which one or more of said controllable-pitch blade(s) (28) are immersed, said axial modulator (32) having axial motion induced by rotation on said axial modulator (32) relative to said rotating system (22) and the constraints imposed by said axial modulator's (32) threaded interaction with said rotating system (22) when electrical current is applied to said axial-modulating mechanism's (35) electromagnets, a pitch manipulator (46) being rotatably mounted within said axial modulator (32) and constrained so that said pitch manipulator (46) is coupled with said axial modulator's (32) axial motion, said pitch manipulator (46) having a mechanical interaction with said controllable-pitch blade(s) (28) to cause its axial motion to cause each of said controllable-pitch blade(s) (28) to vary their pitch, and characterized by, said axial modulator (32) having at least one reluctance protuberance(s) (33), one or more of said axial modulator's (32) reluctance protuberance(s) (33) having a constitution that would cause the respective reluctance protuberance(s) to accelerate when exposed to a magnetic field, an electronics control unit (ECU) (44) having circuits connected to the leads of at least one of said axial modulating mechanism's (35) electromagnets, said electronics control unit (ECU) (44) circuits being capable of selectively switching electric current to each of said axial modulating mechanism's (35) electromagnets in order to cause said axial modulator (32) to rotate.

17. An apparatus for controllable pitch blades as set forth in claim 16 further characterized by said threaded interaction between said axial modulator (32) and said rotating system (22) comprised of a ball screw arrangement.

18. An apparatus for controllable pitch blades as set forth in claim 16 further characterized by said threaded interaction between said axial modulator (32) and said rotating system (22) comprised of a roller screw arrangement.

* * * * *